United States Patent [19]

Rosenberg

[11] Patent Number: 5,111,331
[45] Date of Patent: May 5, 1992

[54] ELECTRO-OPTICAL LIGHT MODULATOR

[75] Inventor: Paul Rosenberg, Larchmont, N.Y.

[73] Assignee: Research Frontiers Incorporated, Woodbury, N.Y.

[21] Appl. No.: 375,730

[22] Filed: Jul. 5, 1989

Related U.S. Application Data

[63] Continuation-in-part of Ser. No. 68,655, Jul. 1, 1987, abandoned.

[51] Int. Cl.$^5$ .................. G02F 1/00; G02B 26/00
[52] U.S. Cl. .................. 359/296; 359/228; 359/276; 359/179
[58] Field of Search ........... 350/356, 362, 267, 96.18, 350/96.13, 96.14; 356/441; 455/605, 610, 611, 615, 616; 359/276, 296, 228, 109, 179, 181, 182, 183, 122, 174

[56] References Cited

U.S. PATENT DOCUMENTS

| | | | |
|---|---|---|---|
| 3,770,339 | 11/1973 | Ramaswamy | 350/96.14 |
| 3,967,265 | 6/1976 | Jacob | 350/362 |
| 4,479,264 | 10/1984 | Lockett et al. | 455/605 |
| 4,711,518 | 12/1987 | Shank et al. | 350/96.15 |
| 4,730,096 | 3/1988 | Mizumoto | 350/362 |
| 4,849,753 | 7/1989 | Merry | 350/356 |

FOREIGN PATENT DOCUMENTS 2120400 11/1983 United Kingdom .

Primary Examiner—Eugene R. LaRoche
Assistant Examiner—Michael B. Shingleton
Attorney, Agent, or Firm—Rosenman & Colin

[57] ABSTRACT

A carrier light beam transmitted through a light valve is modulated to convey information along a communications system. The modulation factor, baud rate and efficiency of the light valve can be increased by directing a modulated light beam a number of times through the valve.

11 Claims, 4 Drawing Sheets

ELECTRO-OPTICAL LIGHT MODULATOR

This application is a continuation-in-part of my co-pending application Ser. No. 068,655, filed July 1, 1987, now abandoned which is incorporated herein by reference thereto.

FIELD OF THE INVENTION

This invention generally relates to electrooptical arrangements for modulating light to convey information along a communications system and, more particularly, to utilizing a light valve for optical communications.

DESCRIPTION OF RELATED ART

Light valves have been used for over fifty years for modulation of light. In Dr. Edwin Land's U.S. Pat. No. 1,955,923, the light valve was defined as a cell formed of two transparent sheets of insulating material spaced apart a small distance and containing a suspension of small particles in a liquid suspending medium. As a practical matter, the suspension also includes a polymeric stabilizer dissolved in the liquid suspending medium to prevent agglomeration of the particles.

In the absence of an applied electrical field, the particles in the liquid suspension exhibit random Brownian movement, and hence a beam of light passing into the cell is reflected, transmitted or absorbed, depending upon the nature and concentration of the particles and the energy content of the light. When an electrical field is applied through the suspension in the light valve, the particles become aligned and, for many suspensions, most of the light can pass through the cell. In some suspensions, however, the light valve will close rather than open when activated, to decrease transmission of light therethrough. An example of such a "reverse" type of light valve is disclosed in U.S. Pat. No. 4,078,856, which is incorporated herein by reference thereto. In other suspensions, the light valve will open in one part of the electromagnetic spectrum and close in another part to provide a "see-saw" light valve, as disclosed in U.S. Pat. No. 3,743,382.

A wide variety of liquids have been suggested as all or part of the light valve liquid suspending medium to suspend the small particles and dissolve the polymeric stabilizer, such as certain esters, nitrobenzene, oils and other liquids. See U.S. Pat. Nos. 1,961,664; 2,290,582 and others. Similarly, a wide variety of inorganic and organic particles have been suggested for use in the light valve, such as mica, aluminum, graphite, metal halides and perhalides of alkaloid acid salts. A preferred light valve suspension is disclosed in U.S. Pat. No. 4,407,565, which is incorporated herein by reference thereto. In the practice of the present invention, any suitable light valve may be used.

In the early days of television, Donal, Langmuir and Goldmark investigated the use of light valves in black and white as well as color television. See U.S. Pat. Nos. 2,290,582; 2,481,621; 2,528,510 and 2,645,976. A more modern use of the light valve is as an alpha-numeric display. Light valves have also been proposed for use in windows, eyeglasses and the like to control the amount of sunlight passing therethrough.

SUMMARY OF THE INVENTION

1. Objects of the Invention

It is a general object of this invention to provide an electro-optical arrangement for modulating light for optical communications involving the use of light valves.

It is another object of this invention to provide a light modulator capable of modulating carrier light beams of high intensity, over a wide range of frequencies, with broad bandwidth, and high bauds.

A further object of this invention is to provide a light modulator capable of operation in many modes, e.g. amplitude modulation and/or frequency modulation.

Another object of this invention is to provide a light modulator of high efficiency and high modulation factor.

Yet another object of this invention is to provide a light modulating arrangement capable of transmitting a modulated light beam to an optical fiber cable with minimal attenuation and loss of the modulated light beam.

Still another object of this invention is to provide a light modulating arrangement utilizing a light valve and an optical fiber cable in which a good optical coupling and impedance match exist between the light valve and the cable.

A still further object of this invention is to provide an energy-efficient light modulator.

2. Features of the Invention

In keeping with these objects, and others which will become apparent hereinafter, one feature of this invention resides, briefly stated, in an electrooptical arrangement for modulating light to convey information along a communications system which comprises a light valve including a pair of light-transmissive electrically-conductive electrodes spaced apart of each other, and a fluid suspension of minute particles dispersed in the suspension between the electrodes and orientable, upon application of a variable electrical field across the electrodes, to have variable light-transmissive characteristics.

The arrangement further comprises transmitter means for transmitting a carrier light beam through the particles in the suspension, as well as modulator means for modulating the carrier light beam to generate an information-carrying modulated light beam at a high efficiency, a high modulation factor and a high baud rate. The modulator means includes a variable electrical modulator, e.g. an amplitude and/or frequency modulator electrically connected to the electrodes for applying a variable electrical field across the suspension and, in turn, for changing orientations and the light-transmissive characteristics of the particles. Receiver means for receiving the modulated light beam from the light valve are employed for conveying the modulated light beam along a path along the communications system.

Advantageously, the receiver means includes optical fiber means having a miniature receiving end of miniature cross-sectional area, e.g. a circular area whose diameter is less than one mm. The miniature receiving end is positioned in the path of the modulated light beam, and is optically coupled to efficiency means operative for increasing the efficiency and modulation factor of the modulator means.

In accordance with one embodiment of this invention, both electrodes of the light valve have large optical windows of large cross-sectional area, e.g. several square inches, larger than said miniature cross-sectional area of the receiving end of the optical fiber means. The modulated light beam exiting the light valve has a correspondingly larger cross-sectional area than the modulated light beam conveyed along the optical fiber means. In this embodiment, the efficiency means includes an optical train, e.g. a set of lenses, positioned in the path between the light valve and the receiving end of the optical fiber means. The optical train optically reduces the larger cross-sectional area of the modulated light beam exiting the light valve to a smaller cross-sectional area corresponding to the miniature receiving end. This optical reduction or focusing of the modulated light beam onto the miniature receiving end serves to prevent signal loss.

In accordance with another embodiment of this invention, both electrodes of the light valve have optical windows which have been miniaturized so as to have miniature cross-sectional areas corresponding to the miniature cross-sectional area of the receiving end of the optical fiber means. Thus, no optical train is needed because the optical window through which the modulated light beam passes constrains the modulated beam to have a cross-section which matches that of the miniature receiving end of the optical fiber means.

In accordance with still another embodiment of this invention, the miniature receiving end of the optical fiber means itself constitutes one of the aforementioned electrodes of the light valve. In this case, the receiving end of the optical fiber means is polished and provided with an electrically-conductive transparent coating and, in an advantageous construction, is situated within the light valve to constitute one of its electrodes. This construction provides a good optical coupling and match, and greatly minimizes , signal loss.

In yet another embodiment of this invention, the modulated light beam is caused to pass through the suspension a plurality of times prior to exiting the light valve. For this purpose, a pair of reflectors facing each other are located at opposite sides of the light valve. Each reflector redirects the modulated light beam impinging thereon onto the other reflector. The multiple passes of the modulated light beam through the light valve greatly increase the modulation factor without requiring increased activating voltage. The just-described light valve with increased modulation factor need not be used solely in connection with optical communications, but may be used in many other applications.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 7:
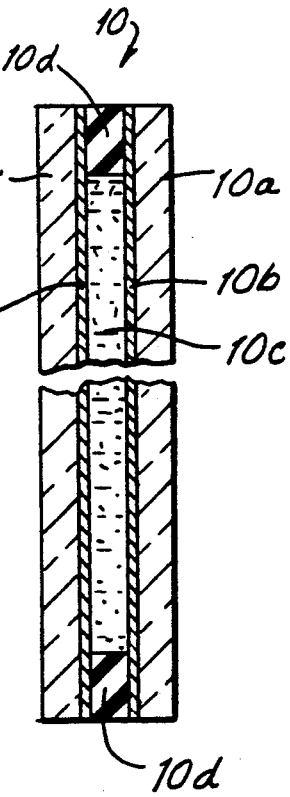
FIG. 7 is an enlarged view of a light valve.

Referring now to the drawings and, more particularly, to FIG. 7 thereof, reference numeral 10 generally identifies a light valve comprising light-transmissive electrically-insulating plates, e.g. glass plates 10a, each having a light-transmissive electrically-conductive coating 10b, e.g. indium tin oxide, serving as an electrode. A fluid suspension 10c of particles is dispersed therein and is provided between the electrodes 10b. A seal or gasket 10d prevents leakage of the suspension 10c out of the valve. The suspension is preferably as described in U.S. Pat. No. 4,407,565, but it may be any liquid suspension of the type described in the above identified patents useful in light valves.

Upon connection of an electric voltage across the electrodes 10b, an electrical field is established across the suspension. This electrical field causes the particles to change their orientations between a closed state wherein light transmission through the suspension is impeded, and an open state in which light transmission through the suspension is enabled. This feature can be used to vary light transmission through the suspension and, in accordance with this invention, a light beam transmitted through the light valve can be modulated with an information signal to convey information along a communications system.

Figure 1:
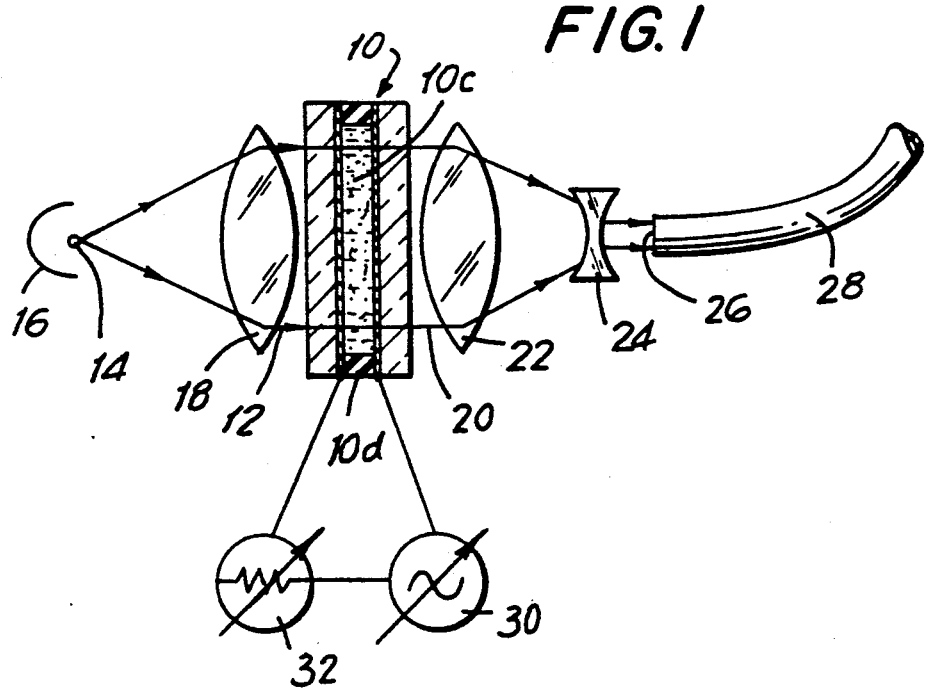
FIG. 1 is a schematic view of one embodiment of an electro-optical light modulating arrangement in accordance with this invention.

Turning to a first embodiment of the invention, as shown in FIG. 1, the light valve 10 is positioned in the path of a carrier light beam 12. Transmitter means including a point light source 14, for example, an incandescent lamp, a halogen lamp, an arc lamp or a xenon lamp, generates light in all directions. A concave reflector 16 at the rear of the source 14 reflects all rearwardly directed light forwardly for collection and collimation by a positive lens system 18. The collimated carrier light beam 12 is directed through the light-transmissive electrodes and the suspension therebetween wherein, as described below, the carrier beam 12 is modulated. A modulated light beam 20 exits the light valve 10 and is collected by a positive lens system 22 and is collimated by a negative lens system 24 prior to entry into a miniature receiving end 26 of an optical fiber means, e.g. an optical filament, fiber, bundle or waveguide, hereinafter referred to as an optical cable 28.

The modulation of the carrier beam 12 is effected by a variable electrical modulator, e.g. a variable frequency generator 30 and/or a variable amplitude generator 32 electrically connected to the electrodes 10b. The modulator is operative for applying a variable electrical field across the suspension 10c and, in turn, for changing the orientations of the particles therein, thereby also correspondingly changing the light-transmissive characteristics of the light valve between the aforementioned closed and open state. For example, the variable frequency generator 30 may have a center frequency of 200 KHz. Since each cycle of the 200 KHz sinusoidal signal will open and close the light valve 10 twice, the carrier light beam 12 will be modulated to twice the center frequency, e.g. 400 KHz.

As for the variable amplitude generator 32, it generates a voltage with a varying amplitude which, in turn, varies the intensity of the carrier light beam 12. Hence, the carrier light beam enters the optical cable 28 by being either frequency modulated and/or amplitude modulated.

In the FIG. 1 embodiment, the cross-section of the carrier light beam immediately entering the valve 10, as well as the cross-section of the modulated light beam 20 immediately exiting from the valve, each measure on the order of square inches and, for ease of discussion, will be described herein and in the claims as being "large", at least when compared to the miniature receiving end 26 of the optical cable 28 whose cross-section is typically circular and has a diameter less than one mm so that, for ease of discussion, the cross-sectional area of the miniature receiving end 26 can be described herein and in the claims as being "small" or "miniature".

Put another way, the light valve of FIG. 1 has large optical entrance and exit apertures or windows to permit not only a carrier light beam of large cross-section to be collected from the source 14, but also a modulated beam of large cross-section can be collected for delivery to cable 28. To minimize light loss between valve 10 and cable 28, the aforementioned lens systems 22, 24 optically reduce and focus substantially all of the larger-sized modulated light beam 20 onto the miniature receiving end 26 with minimum spillover. As an option, a non-illustrated infrared filter may be inserted in the light path between the light source 14 and the valve 10 to avoid overheating of the valve.

Figure 2:
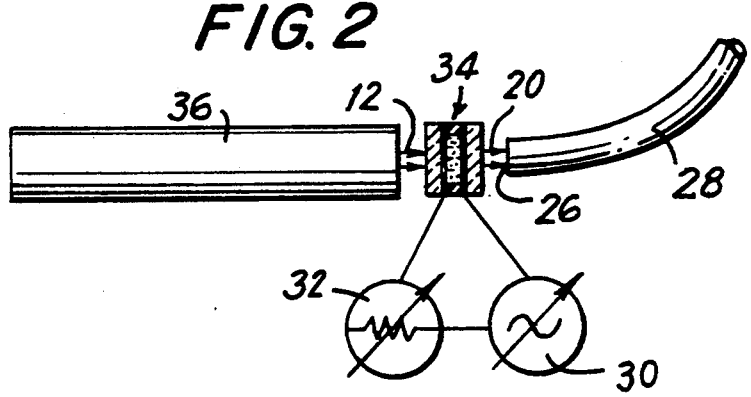
FIG. 2 is a schematic view of a second embodiment of an electro-optical light modulating arrangement in accordance with this invention.

Turning now to a second embodiment of the invention, as shown in FIG. 2, a miniaturized light valve 34, identical to light valve 10 but of much smaller dimensions, e.g. whose exit optical aperture has the same or a slightly greater cross-sectional area as compared to the receiving end 26 of cable 28, is positioned in the path of a collimated carrier light beam 12. In this case, rather than providing a point source and collection and collimation optics, a gas laser tube 36 can be employed. The entrance and exit optical apertures of the miniaturized light valve 34 is just large enough to accommodate the carrier light beam 12. No lenses are necessary either upstream or downstream of valve 34. The carrier beam is modulated, as described earlier, by modulators 30 and/or 32 to generate the modulated light beam 20 which is received at receiving end 26 of cable 28.

The spaced-apart conductive electrodes 10b of a light valve constitute a parallel plate electrical capacitor. Due to the smaller cross-sectional area of the electrodes 10b of miniaturized valve 34, the miniaturized valve 34 has a smaller electrical capacitance or impedance, as compared to larger light valve 10. Not only does the miniaturized valve 34 draw less electrical current than the larger valve 10, but the miniaturized valve 34 can be driven at higher modulation frequencies and more efficiently. More information per unit time can be carried by the light beam, and this information can be more rapidly transmitted on the communications system and at higher signaling rates, i.e. at more bauds, and with greater bandwidth, as compared to valve 10. The miniaturized valve 34 can thus be run much more efficiently and inexpensively, as compared to valve 10.

Figure 3:
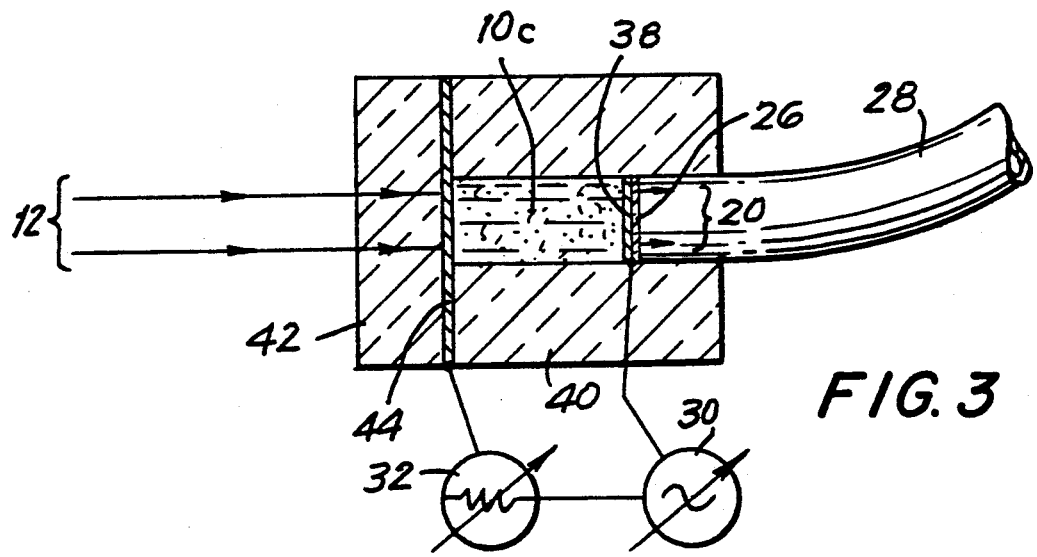
FIGS. 3, 3a and 3b are schematic views of a third, fourth and fifth embodiment of an electro-optical light modulating arrangement in accordance with this invention.

Turning now to a third embodiment of this invention, as shown in FIG. 3, a collimated carrier light beam 12 is modulated, as described earlier, by either modulator 30 and/or 32 to generate a modulated light beam 20 which is received by miniature receiving end 26 of cable 28. However, this time, the receiving end 26 is employed as one of the electrodes of the light valve. For this purpose, the receiving end 26, which is constituted of glass, is preferably polished and coated with an electrically-conductive transparent coating 38. The coated end 26 is inserted into a bore formed at the rear of an annular glass support 40. The other electrode comprises a glass plate 42 on which an electrically-conductive transparent coating 44 is deposited. The modulators 30 and/or 32 are electrically connected to the coatings 38, 44. Suspension 10c is contained between the coatings 38, 44.

The FIG. 3 embodiment is advantageous because not only does it have all the advantages of the FIG. 2 embodiment, but also, it greatly conserves the light that would otherwise be lost. For example, in FIG. 1, light is lost at the glass-air interface of the plate at the rear of the valve 10, and also at each lens 22 and 24 of the receiving optics. In FIG. 2, light is lost at the glass-air interface of the plate at the rear of the valve 34. However, in the FIG. 3 embodiment, there are no lenses or any glass-air interfaces at the rear of the valve. Instead, the modulated light beam directly enters into the receiving end 26 of cable 28. The FIG. 3 construction also insures a proper opto-mechanical alignment between the light valve and the optical cable.

Figure 4:
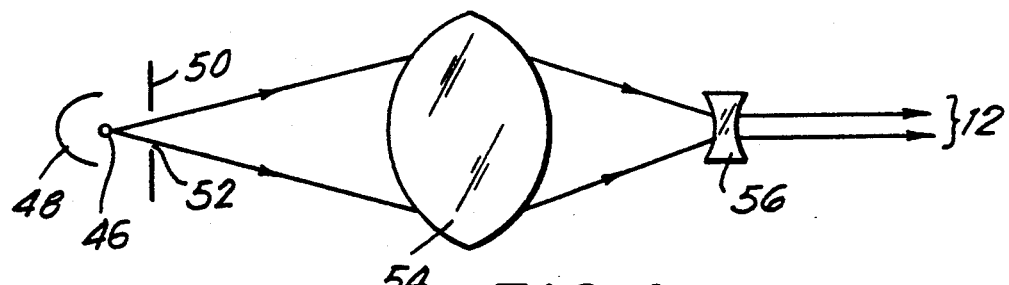
FIG. 4 is a schematic view of a transmitter for transmitting collimated light to any of the arrangements of FIGS. 1 or 3.

Returning to FIG. 3, the collimated light beam 12 can come from a gas or solid state laser, or from a transmitter arrangement of the type shown, for example, in FIG. 4 wherein light from a point source 46 is directed forwardly with the aid of a rear reflector 48 through a mask 50 having a pupil 52 for collection by positive lens 54 and for collimation by negative lens 56 to form a small diameter concentrated carrier light beam 12.

Figure 5:
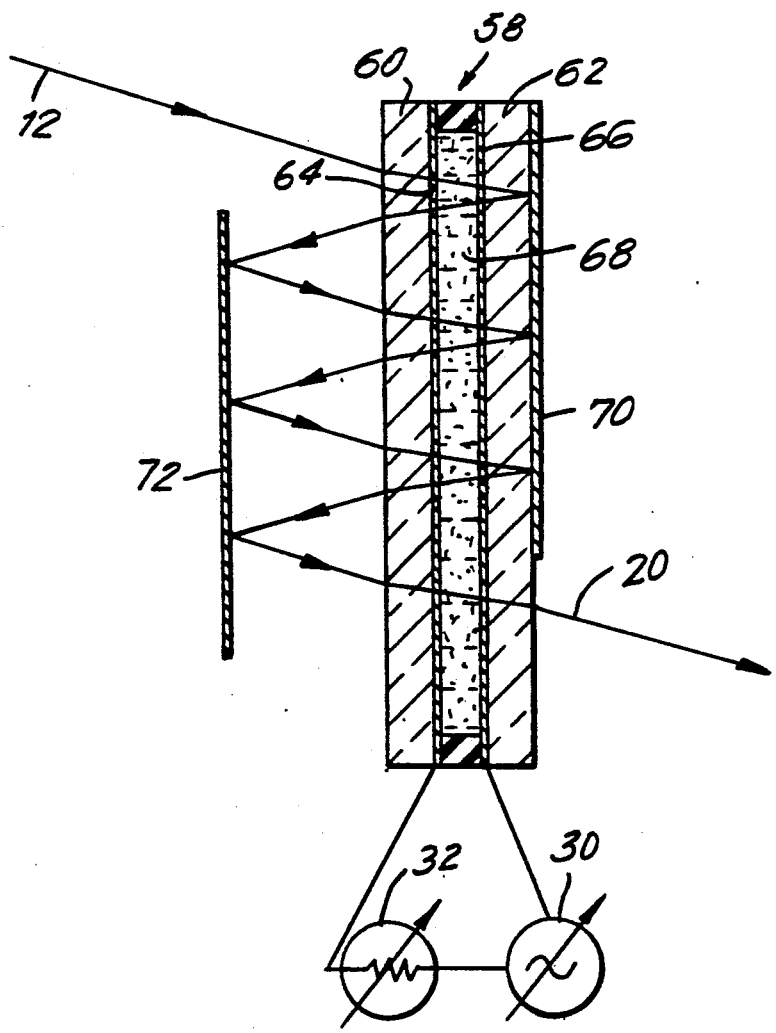
FIG. 5 is a schematic view of a sixth embodiment of an electro-optical light modulating arrangement in accordance with this invention.
Figure 6:
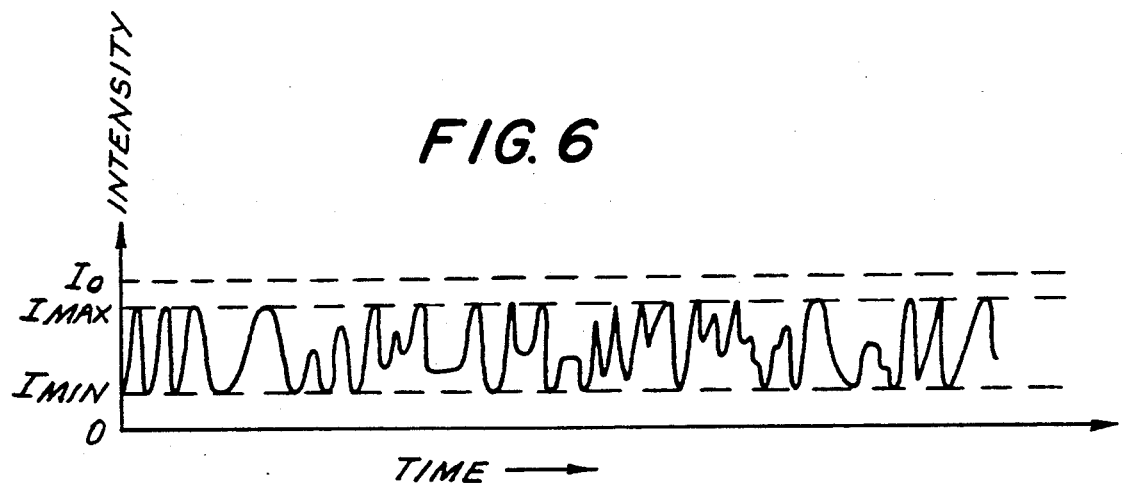
FIG. 6 is a graph of light intensity vs. time of the light modulator arrangements of this invention, particularly the arrangement of FIG. 5.

Before turning to FIG. 5, FIG. 6 is a graph of intensity of a light beam vs. time of an amplitude modulated light beam after it emerges from one of the light valves described above. $I_o$ is the intensity of the carrier light beam just before it enters the light valve. $I_{max}$ is the maximum or peak intensity of the modulated light beam after it emerges from the light valve. In other words, $I_{max}$ is the intensity of the emerging modulated light beam in the fully open state of the light valve at the maximum applied operating voltage, wherein the particles in the suspension 10c are oriented to allow the maximum amount of light to be transmitted through the valve. $I_{min}$ is the intensity of the emerging modulated light beam with the light valve in the fully closed state, i.e. with zero voltage applied across the electrodes.

The shape of the modulated light beam in FIG. 6 is exemplary and, indeed, virtually any shape or shapes of an amplitude modulated beam varying between $I_{max}$ and $I_{min}$ is within the spirit and scope of this invention. An amplitude modulation factor (or index) M can be defined as:

$$M = (I_{max} - I_{min})/I_{max}$$
$$= 1 - I_{min}/I_{max}$$

M is a measure of the amount of modulation, i.e. the strength or effectiveness of the amplitude modulation. For a suspension of a given particle concentration, M can be increased by making the device thicker, i.e. by increasing the distance between the electrodes 10b of the light valve. However, this would require that the applied modulating voltage across the electrodes be increased with undesirable complexity and expense in the circuitry that generates the modulating voltages and currents.

FIG. 5 illustrates an arrangement wherein the amplitude modulation factor M can be increased without increasing the distance between the electrodes and without increasing the magnitude of the applied modulating voltage. As before, light valve 58 of FIG. 5 comprises a front glass plate 60 and a rear glass plate 62. Electrically conductive transparent coatings 64 and 66 are provided on interior surfaces of plates 60, 62. A fluid suspension 68, identical or similar, to the aforementioned suspension 10c, is provided between coatings 64, 66 which serve as electrodes. In order to increase the modulation factor M and efficiency of valve 58, a pair of reflectors 70, 72, i.e. mirrors, are provided at opposite sides of valve 58. The mirrors 70, 72 are operative for passing the modulated light beam through the suspension 68 a plurality of times prior to exiting the valve. In effect, one reflector re-directs the modulated light beam impinging thereon onto the other reflector. As shown, reflector 72 is positioned away from front plate 60, and reflector 70 is positioned on plate 62. It will be readily understood that both reflectors 70, 72 can be positioned on or off plates 60, 62 and, furthermore, reflector 72 can be positioned on plate 60 while reflector 70 is positioned off plate 62. In any of these various combinations, the reflectors 70, 72 are positioned so as to keep "bouncing" the modulated light beam back and forth through the suspension 68 until, finally, the modulated light beam 20 is permitted to exit the valve 58.

As shown, the modulated light beam traverses the suspension seven times. The beam can be made to traverse the valve any odd or even number of times.

The following Table I illustrates how multiple passes through light valve 58 increase the modulation factor M:

TABLE I

| Number of Passes | $\frac{I_{max}}{I_o}$ | $\frac{I_{min}}{I_o}$ | $\frac{I_{min}}{I_{max}}$ | $M = 1 - \frac{I_{min}}{I_{max}}$ |
|---|---|---|---|---|
| 1 | .60 | .30 | .5 | .5 |
| 2 | .36 | .09 | .25 | .75 |
| 3 | .22 | .027 | .12 | .88 |
| 1 | .85 | .20 | .24 | .76 |
| 2 | .72 | .04 | .055 | .95 |
| 3 | .61 | .008 | .013 | .99 |

The valve 58 with its multiple pass-through feature efficiently utilizes power since less voltage need be applied across the electrodes 64, 66 to achieve a given degree of modulation. Although the valve 58 ha been described in connection with modulating light for conveying information in communications systems, its multiple pass-through feature can be utilized in many other applications.

Figure 3A:
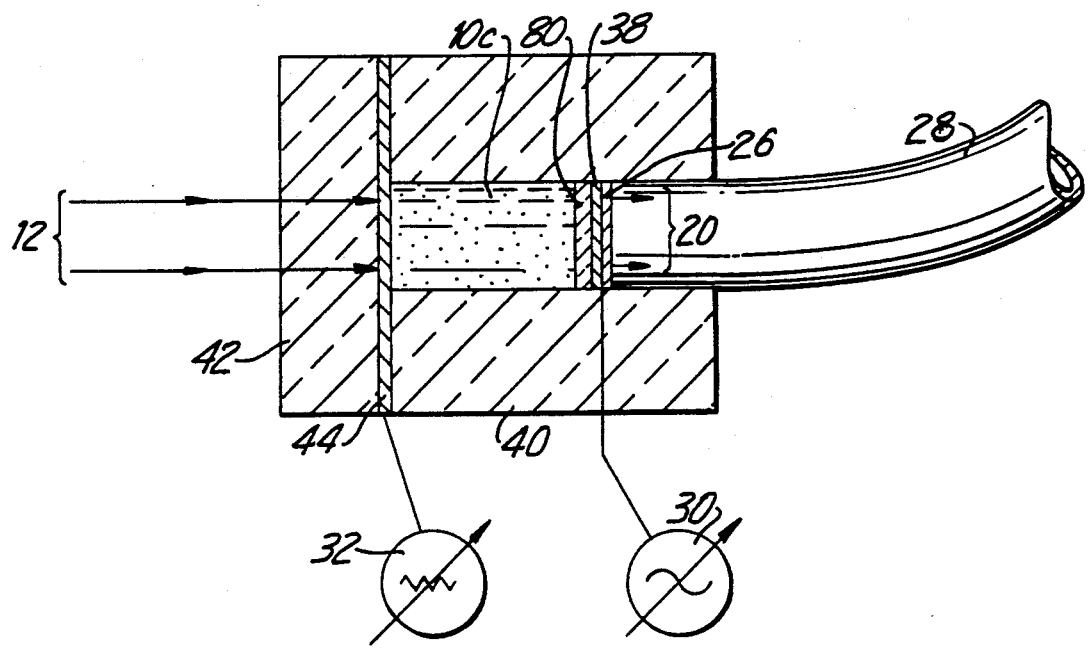
Figure 3B:
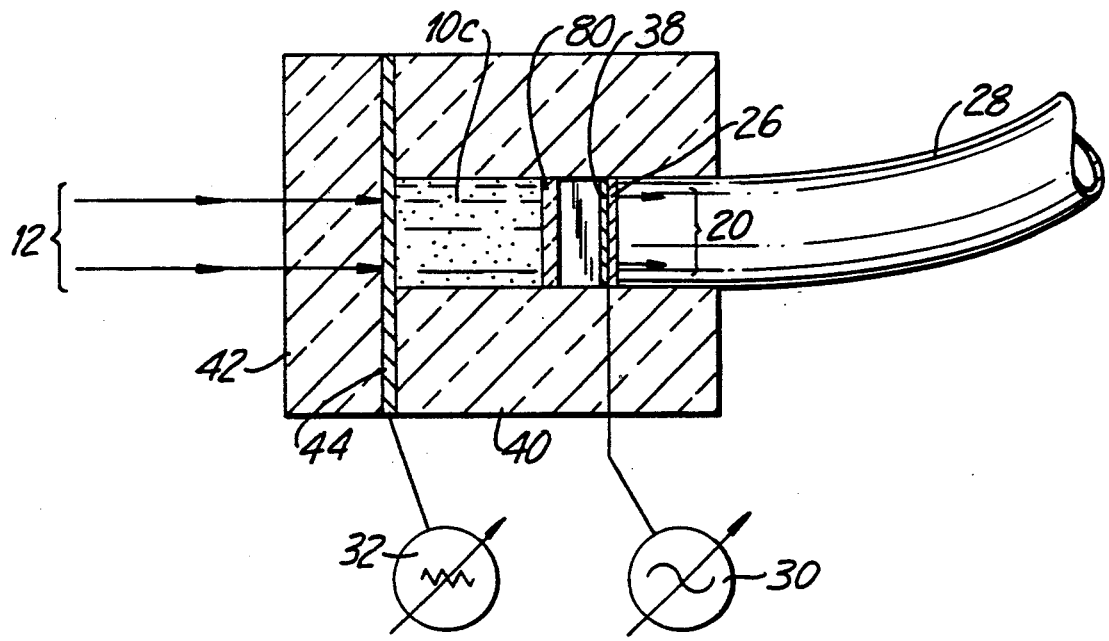

As previously described in connection with FIG. 3, the receiving end of the optical fiber can be formed as one of the electrodes of the light valve. An electrically-conductive, transparent coating is applied over the receiving end to form a coated receiving end. The coated receiving end may be in fluid contact with the fluid suspension (FIG. 3), or in surface contact with a transparent cell wall 80 of the valve (FIG. 3a), or be spaced from such a cell wall 80 (FIG. 3b).

Furthermore, the formation of a bore in the light valve, and particularly in a transparent cell wall of the light valve, assures an optical and mechanical alignment between the receiving end of the optical fiber that has been inserted into the bore and the modulated light beam exiting the valve. The bore closely surrounds the receiving end with a tight, frictional fit. The receiving end may be placed in surface contact with, or spaced apart from, an interior cell wall within the bore, or be placed in fluid contact with the fluid suspension. In the latter case, by coating the receiving end with an electrically-conductive, transparent coating, the coated receiving end serves as one of the electrodes for the valve.

It will be understood that each of the elements described above, or two or more together, also may find a useful application in other types of constructions differing from the types described above.

While the invention has been illustrated and described as embodied in an electro-optical light modulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An electro-optical arrangement for modulating light to convey information along a communications system, comprising:
   (a) a light valve including a pair of light-transmissive, electrically-conductive electrodes spaced apart of each other, and a fluid suspension of particles dispersed in the suspension between the electrodes and orientable to have variable light-transmissive characteristics;
   (b) transmitter means for transmitting a carrier light beam through the electrodes and the particles in the suspension;
   (c) modulator means for modulating the carrier light beam to generate an information-carrying, modulated light beam, said modulator means including a variable electrical modulator electrically connected to the electrodes applying a variable electrical field across the suspension and, in turn, for changing orientations and the light-transmissive characteristics of the particles; and
   (d) receiver means including optical fiber means having a receiving end coated with a light-transmissive, electrically-conductive coating that constitutes one of said electrodes of the light valve, said receiving end being positioned in the path of the modulated light beam for receiving the modulated light beam through the coating, said optical fiber means being connected to and extending away from the light valve in a path along the communications system.

2. The arrangement as recited in claim 1, wherein the coating is in fluid contact with the fluid suspension.

3. The arrangement as recited in claim 1, wherein the light valve includes a transparent cell wall.

4. The arrangement as recited in claim 3, wherein the coated receiving end is in surface contact with the cell wall.

5. The arrangement as recited in claim 3, wherein the is spaced from the cell wall.

6. An electro-optical arrangement for modulating light to convey information along a communications system, comprising:
   (a) a light valve including a bore, a pair of light-transmissive, electrically-conductive electrodes spaced apart of each other, and a fluid suspension of particles dispersed in the suspension between the electrodes and orientable to have variable light-transmissive characteristics;
   (b) transmitter means for transmitting a carrier light beam through the electrodes and the particles in the suspension;
   (c) modulator means for modulating the carrier light beam to generate an information-carrying, modulated light beam, said modulator means including a variable electrical modulator electrically connected to the electrodes for applying a variable electrical field across the suspension and, in turn, for changing orientations and the light-transmissive characteristics of the particles; and
   (d) receiver means including optical fiber means having a receiving end mounted in optical and mechanical alignment within the bore and positioned in the path of the modulated light beam for receiving the modulated light beam through one of the electrodes of the light valve, said optical fiber means extending away from the light valve in a path along the communications system.

7. The arrangement as recited in claim 6, wherein the receiving end has an electrically-conductive, transparent coating thereon that constitutes one of the light-transmissive electrodes of the light valve.

8. The arrangement as recited in claim 7, wherein the coating is in surface contact with the cell wall.

9. The arrangement as recited in claim 7, wherein the coating is in fluid contact with the fluid suspension.

10. The arrangement as recited in claim 7, wherein the light valve includes a transparent cell.

11. The arrangement as recited in claim 6; and further comprising means for collimating the carrier light beam to form parallel rays of light; and wherein the bore is aligned with the parallel light rays.

* * * * *